US012730013B2

(12) United States Patent
Lee et al.

(10) Patent No.: US 12,730,013 B2
(45) Date of Patent: Sep. 8, 2026

(54) RESISTANCE-BASED ON-CHIP TEMPERATURE SENSOR

(71) Applicant: GIST(Gwangju Institute of Science and Technology), Gwangju (KR)

(72) Inventors: Min Jae Lee, Gwangju (KR); Jun Ho Kim, Gwangju (KR); Sin Ho Lee, Gwangju (KR)

(73) Assignee: GIST(Gwangju Institute of Science and Technology), Gwangju (KR)

( * ) Notice: Subject to any disclaimer, the term of this patent is extended or adjusted under 35 U.S.C. 154(b) by 409 days.

(21) Appl. No.: 18/468,569

(22) Filed: Sep. 15, 2023

(65) Prior Publication Data

US 2024/0183721 A1 Jun. 6, 2024

(30) Foreign Application Priority Data

Dec. 5, 2022 (KR) ........................ 10-2022-0168105

(51) Int. Cl.
*G01K 7/16* (2006.01)

(52) U.S. Cl.
CPC ...................................... *G01K 7/16* (2013.01)

(58) Field of Classification Search
None
See application file for complete search history.

(56) References Cited

U.S. PATENT DOCUMENTS 7,982,550 B1 * 7/2011 Quevy ...................... H03L 7/16
331/66

* cited by examiner

*Primary Examiner* — Cassandra F Cox
(74) *Attorney, Agent, or Firm* — Studebaker Brackett PLLC

(57) ABSTRACT

The present invention relates to a resistance-based on-chip temperature sensor which may autonomously operate in a chip. A resistance-based on-chip temperature sensor according to an exemplary embodiment of the present invention includes: a first RC oscillator having an in-chip first resistor as a component; a second RC oscillator having an in-chip second resistor as the component; and a control unit determining the temperature of the chip according to what difference between the numbers of clocks output from the first and second RC oscillators, respectively is for the same time.

6 Claims, 7 Drawing Sheets

INV1

INV2

R

C

V $C_B$

RESISTANCE-BASED ON-CHIP TEMPERATURE SENSOR

CROSS-REFERENCE TO RELATED APPLICATIONS

This application claims the priority of Korean Patent Application No. 10-2022-0168105 filed on Dec. 5, 2022, in the Korean Intellectual Property Office, the disclosure of which is incorporated herein by reference.

BACKGROUND OF THE INVENTION

Field of the Invention

The present invention relates to a resistance-based on-chip temperature sensor which may autonomously operate in a chip.

Description of the Related Art

Recently, SOC (System on Chips), such as MicroController Unit (MCU), are designed in a very narrow space. This causes an increase in internal temperature of a chip, so it is necessary to monitor the temperature to ensure a safe and reliable system operation. To this end, various on-chip temperature sensors have been being studied recently.

In particular, in temperature monitoring, it is important to identify an overheating point in the chip, and it is very difficult to predict which position is overheating when designing an initial chip, so in general, dozens of temperature sensors are placed at a plurality of random positions (multi-site integration) to monitor the overheating point.

Among the temperature sensors, a resistance-based temperature sensor has an advantage of good accuracy and resolution because the resistance-based temperature sensor senses a temperature using resistance characteristics of elements that constitute the chip, but basically occupies a large area and must be driven at a high voltage.

Further, the resistance-based temperature sensor requires a clock to convert an analog voltage into a digital signal, and the conventional sensor uses a clock outside the sensor, so there is a limit in that the sensor cannot autonomously operate, and when sensors are disposed at a plurality of locations as described above, there is a problem in that a wiring area for supplying an external clock to each sensor should be additionally ensured in the chip.

SUMMARY OF THE INVENTION

An object of the present invention is to provide a resistance-based temperature sensor which can autonomously operate in a chip without an external clock for temperature sampling.

The objects of the present invention are not limited to the above-mentioned objects, and other objects and advantages of the present invention that are not mentioned can be understood by the following description, and will be more clearly understood by embodiments of the present invention. Further, it will be readily appreciated that the objects and advantages of the present invention can be realized by means and combinations shown in the claims.

In order to achieve the object, a resistance-based on-chip temperature sensor according to an exemplary embodiment of the present invention includes: a first RC oscillator having an in-chip first resistor as a component; a second RC oscillator having an in-chip second resistor as the component; and a control unit determining the temperature of the chip according to what difference between the numbers of clocks output from the first and second RC oscillators, respectively is for the same time.

In an exemplary embodiment, the first resistor is selected as the in-chip diffusion resistor and the second resistor is selected as the in-chip poly resistor.

In an exemplary embodiment, the first and second resistors are selected as resistors having maximum and minimum temperature coefficients of resistance, respectively.

In an exemplary embodiment, the resistance-based on-chip temperature sensor further includes an auxiliary capacitor connected to one end of an internal capacitor of each of the first and second RC oscillators.

In an exemplary embodiment, the control unit determines the temperature of the chip according to the number of second clocks output from the second RC oscillator for a time when the number of first clocks output from the first RC oscillator reaches a predetermined clock number.

In an exemplary embodiment, the control unit includes a first bit counter connected to an output end of the first RC oscillator and counting a rising edge of the first clock, a second bit counter connected to an output end of the second RC oscillator and counting the rising edge of the second clock, a counter driver stopping operations of the first and second bit counters when a most significant bit (MSB) of the first bit counter is in a high state, and a processor determining the temperature of the chip based on a bit counted by the second bit counter up to the time of the stop.

In an exemplary embodiment, the control unit further includes a first NAND gate receiving the first clock as any one input and a done signal as the other one input, and outputting a logic result to the first bit counter, and a second NAND gate receiving the second clock as any one input and a done signal as the other one input, and outputting the logic result to the second bit counter, and the counter driver changes the done signal to the high state when the MSB of the first bit counter is in the high state.

According to the present invention, as resistance-based temperature sensing is possible without an external clock for temperature sampling, a substrate area for providing a temperature sensor can be minimized while maintaining a sensing performance having high accuracy and high resolution which are advantages resistance-based sensing.

In addition to the above-described effects, the specific effects of the present invention are described together while describing specific matters for implementing the invention below.

BRIEF DESCRIPTION OF THE DRAWINGS

FIGS. 4 and 5 are diagrams illustrating an oscillator structure according to each embodiment.

DETAILED DESCRIPTION OF THE PREFERRED EMBODIMENT

Figure 1:
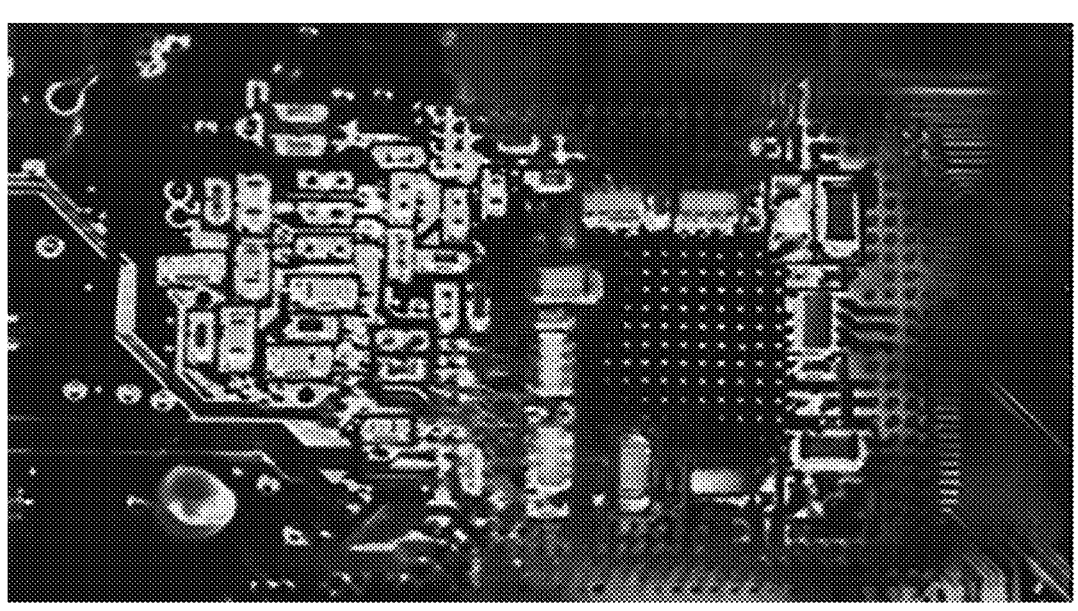
FIG. 1 is a diagram illustrating an increase in PCB internal temperature.

The above-mentioned objects, features, and advantages will be described in detail with reference to the drawings, and as a result, those skilled in the art to which the present invention pertains may easily practice a technical idea of the present invention. In describing the present invention, a detailed description of related known technologies will be omitted if it is determined that they unnecessarily make the gist of the present invention unclear. Hereinafter, a preferable embodiment of the present invention will be described in detail with reference to the accompanying drawings. In the drawings, the same reference numeral is used for representing the same or similar components.

Although the terms "first", "second", and the like are used for describing various components in this specification, these components are not confined by these terms. The terms are used for distinguishing only one component from another component, and unless there is a particularly opposite statement, a first component may be a second component, of course.

Further, in this specification, any component is placed on the "top (or bottom)" of the component or the "top (or bottom)" of the component may mean that not only that any configuration is placed in contact with the top surface (or bottom) of the component, but also that another component may be interposed between the component and any component disposed on (or under) the component.

In addition, when it is disclosed that any component is "connected", "coupled", or "linked" to other components in this specification, it should be understood that the components may be directly connected or linked to each other, but another component may be "interposed" between the respective components, or the respective components may be "connected", "coupled", or "linked" through another component.

Further, a singular form used in the present invention may include a plural form if there is no clearly opposite meaning in the context. In the present invention, a term such as "comprising" or "including" should not be interpreted as necessarily including all various components or various steps disclosed in the present invention, and it should be interpreted that some component or some steps among them may not be included or additional components or steps may be further included.

In addition, in this specification, when the component is called "A and/or B", the component means, A, B or A and B unless there is a particular opposite statement, and when the component is called "C or D", this means that the term is C or more and D or less unless there is a particular opposite statement. Hereinafter, referring to FIGS. 1 to 10, a resistance-based on-chip temperature sensor according to an exemplary embodiment of preset invention will be described in detail.

Figure 2:
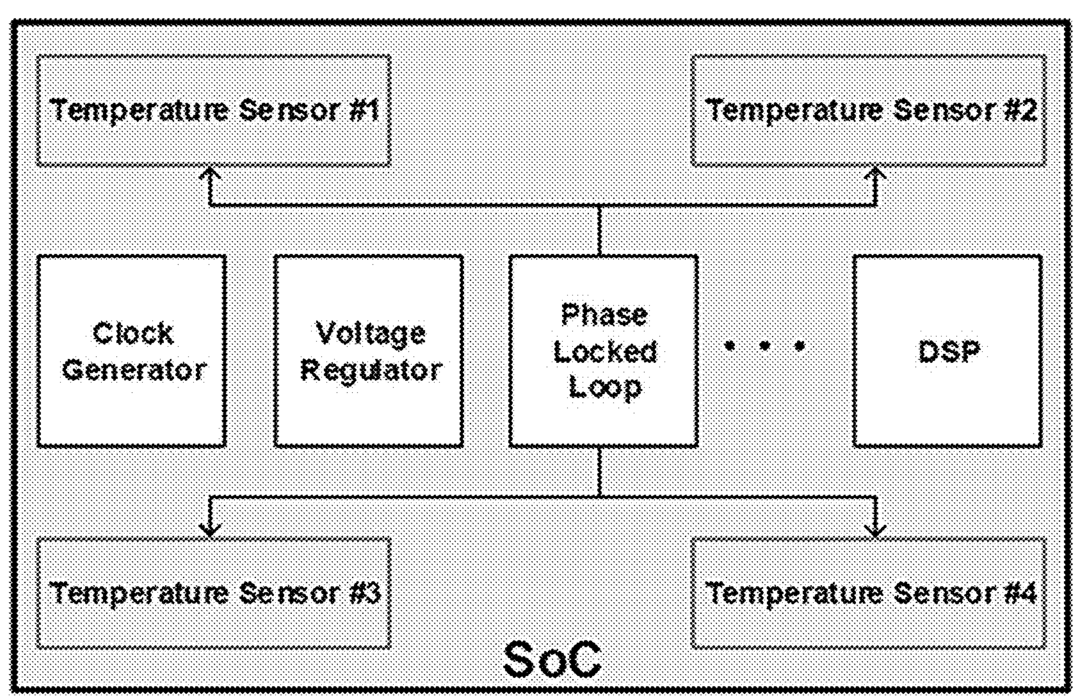
FIG. 2 is a diagram exemplarily illustrating temperature sensors disposed at a plurality of locations in an SoC.

FIG. 1 is a diagram illustrating an increase in PCB internal temperature and FIG. 2 is a diagram exemplarily illustrating temperature sensors disposed at a plurality of locations in an SoC.

Figure 3:
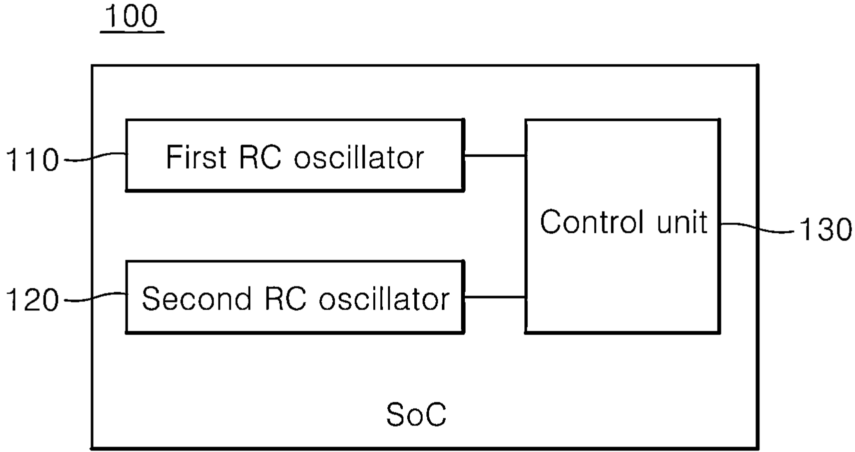
FIG. 3 is a diagram illustrating a resistance-based on-chip temperature sensor according to an exemplary embodiment of the present invention.

FIG. 3 is a diagram illustrating a resistance-based on-chip temperature sensor according to an exemplary embodiment of the present invention.

Figure 4:
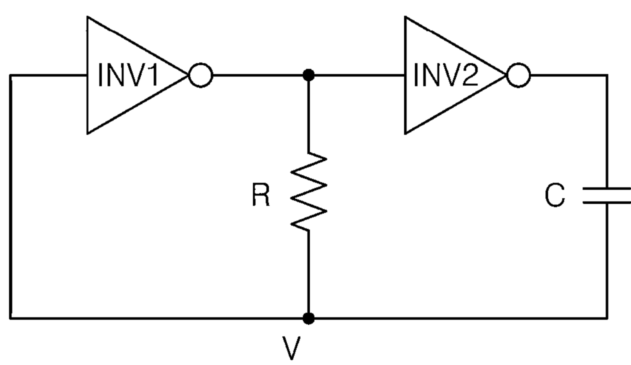
Figure 5:
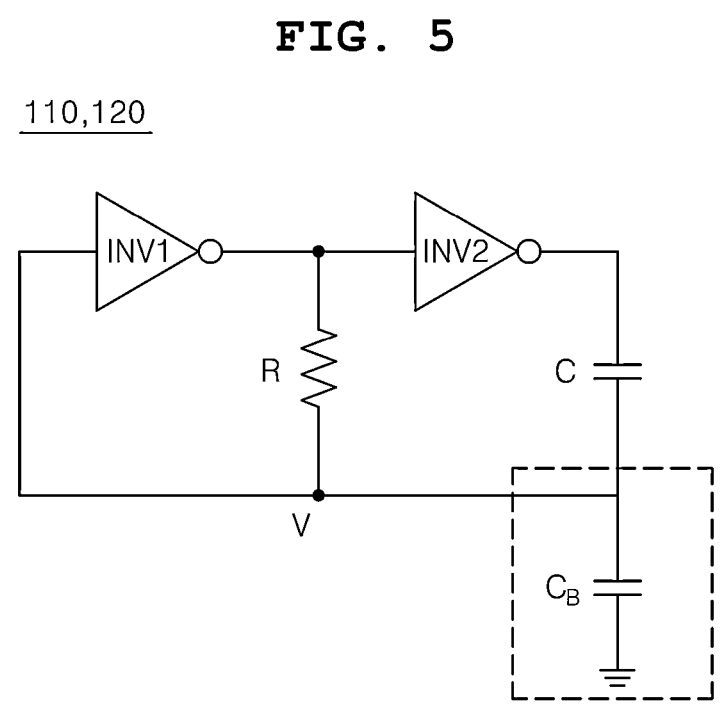
Figure 6:
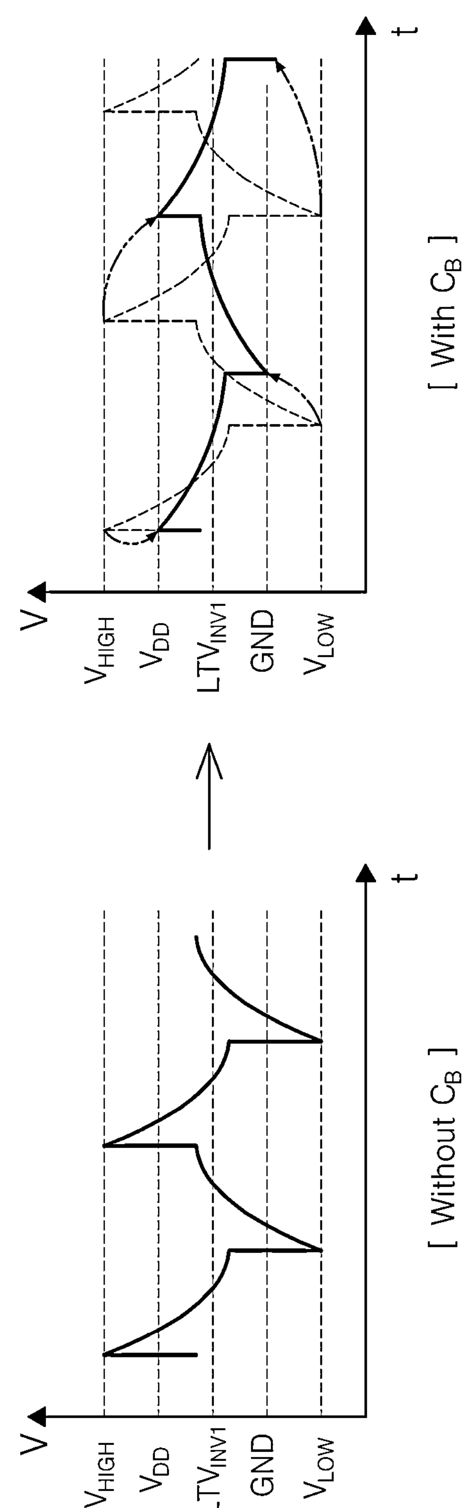
FIG. 6 is a graph comparing and illustrating outputs of oscillators illustrated in FIGS. 4 and 5, respectively.

FIGS. 4 and 5 are diagrams illustrating an oscillator structure according to each embodiment and FIG. 6 is a graph comparing and illustrating outputs of oscillators illustrated in FIGS. 4 and 5, respectively.

Figure 7:
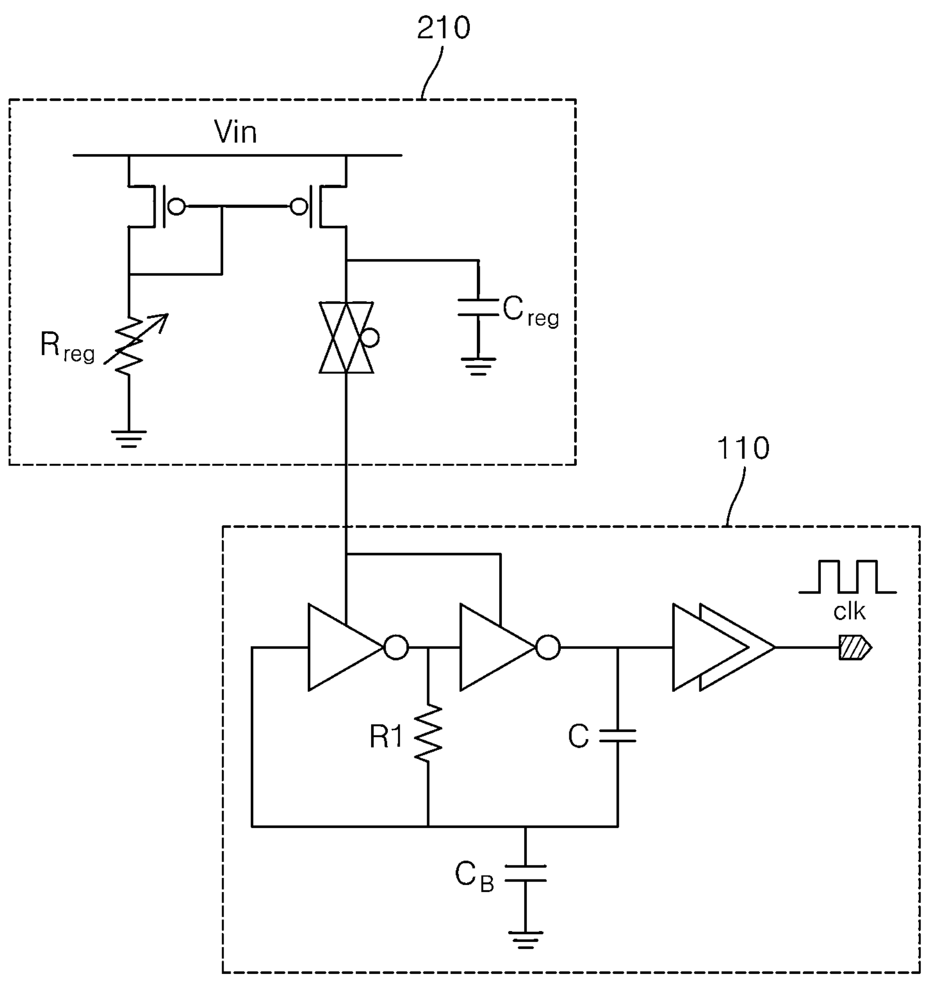
FIG. 7 is a diagram illustrating a state in which a low drop-output (LDO) circuit supplies power to the oscillator.

FIG. 7 is a diagram illustrating a state in which a low drop-output (LDO) circuit supplies power to the oscillator.

Figure 8:
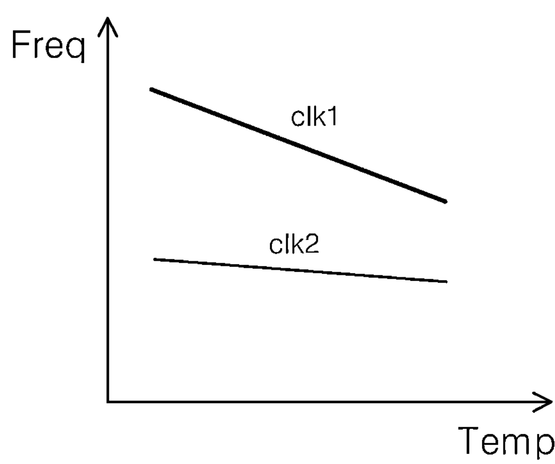
FIG. 8 is a graph comparing and illustrating frequencies of first and second clocks according to temperatures of first and second resistors.

FIG. 8 is a graph comparing and illustrating frequencies of first and second clocks according to temperatures of first and second resistors.

Figure 9:
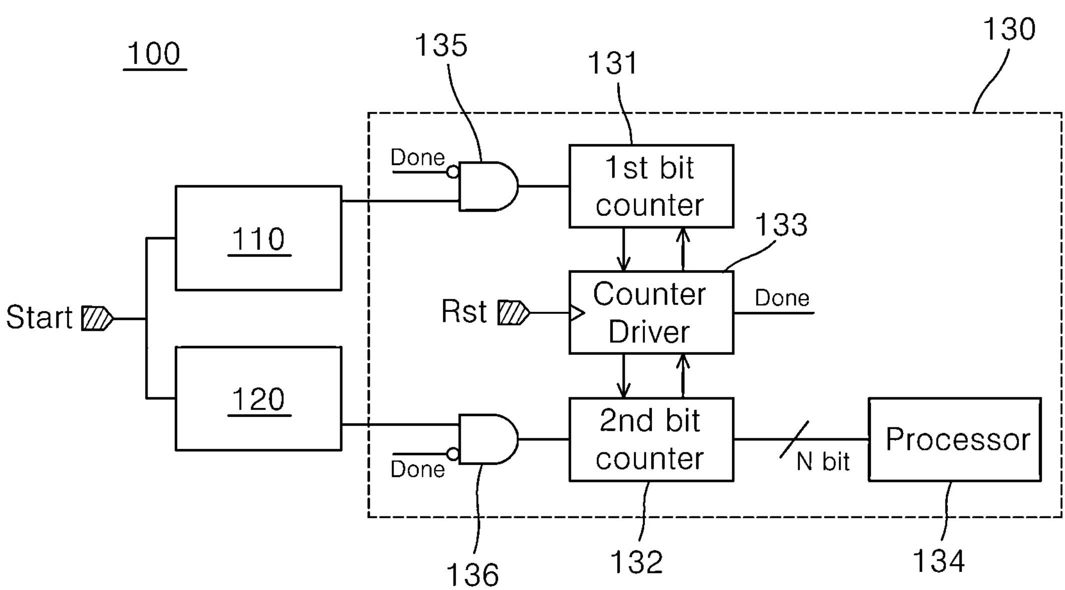
FIG. 9 is a diagram illustrating a structure of a control unit according to an exemplary embodiment of the present invention.
Figure 10:
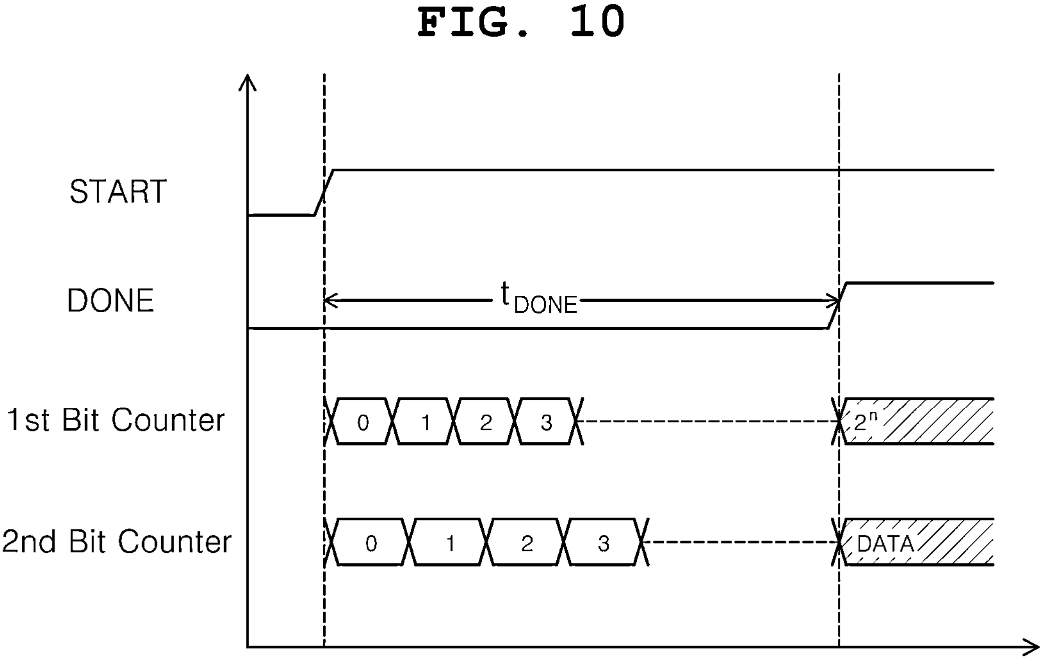
FIG. 10 is a diagram illustrating a signal flow according to an operation of the control unit.

FIG. 9 is a diagram illustrating a structure of a control unit according to an exemplary embodiment of the present invention and FIG. 10 is a diagram illustrating a signal flow according to an operation of the control unit.

Recently, as SOC (System on Chips), such as MicroController Unit (MCU), are designed in a very narrow space, a decrease in system performance occurs due to a temperature rise internal elements in a chip.

When FIG. 1 is described as an example, heat may be generated from individual elements on a printed circuit board (PCB) constituting the SoC, and when a specific area is overheated, an element located in the area is deteriorated or damaged, resulting in lower performance and error of the system.

In order to prevent this, it is important to identify an overheating point in the chip, and it is very difficult to predict which position is overheating at the time of designing the chip, so in general, dozens of temperature sensors are placed at various positions to monitor the overheating point.

When FIG. 2 is described as an example, an engineer may arrange temperature sensors at four different positions in order to monitor the overheating point when designing the SoC including a voltage regulator, a phase locked loop (PLL), a digital signal processor (DSP), etc.

In this case, when the resistance-based temperature is used, a resistance for temperature measurement should be additionally arranged, so there is a disadvantage in that a wide substrate area should be allocated for the temperature sensor.

In addition, in the resistance-based temperature sensor, a reference clock for signaling sampling is required, and to this end, as illustrated in FIG. 2, a clock generator should be additionally provided in the SoC, and when sensors are arranged at a plurality of positions, there is a problem in that even a wiring area for the clock generator to each sensor should be additionally ensured.

The present invention relates to an on-chip temperature sensor which measures the temperature based on a resistance, and may automatically operate without an external clock generator.

Referring to FIG. 3, the temperature sensor according to an exemplary embodiment of the present invention may be provided inside the SoC, and may include a first RC oscillator 110, a second RC oscillator 120, and a control unit 130. However, the temperature sensor 100 illustrated in FIG. 1 follows an exemplary embodiment, and constituent elements thereof are illustrated to the exemplary embodiment illustrated in FIG. 1 and if necessary, some constituent elements may be added, modified, or deleted.

The first and second RC oscillators 110 and 120 may have the same structure except for different internal resistance sizes. As a result, hereinafter, for convenience of description, the first and second RC oscillators 110 and 120 may be simply collectively referred to as an RC oscillator.

Referring to FIG. 4, the RC oscillator according to an exemplary embodiment of the present invention may be constituted by two inverters INV1 and INV2, a resistor R, and a capacitor C. When power is supplied to each of the inverters INV1 and INV2, the RC oscillator performs an oscillation operation to generate a clock. However, the structure of the RC oscillator is not limited thereto, and may have various structures in the art, and the number of inverters connected to the resistor in parallel may also be provided as three, for example.

Meanwhile, when the RC oscillator is configured to include only a single capacitor as illustrated in FIG. 5, a size V of the clock output from the RC oscillator may be larger than a power supply voltage $V_{DD}$ supplied to the inverter or lower than a ground voltage GND. In this case, a stress may become larger, which is applied to an MOSFET in the inverter, and reliability and safety of an inverting operation may be lowered.

Referring to FIG. 5, in order to prevent the problem, the RC oscillator may further include an auxiliary capacitor $C_B$ connected between one end of an internal capacitor C and the ground. A total capacitor capacity of the RC oscillator may be further increased by the auxiliary capacitor $C_B$, and as a result, a maximum size and a minimum size of the clock may be controlled.

Specifically, referring to FIG. 6, when there is no auxiliary capacitor $C_B$, the maximum size VHIGH of the clock may be larger than the power supply voltage $V_{DD}$, and the minimum size $V_{LOW}$ of the clock may be smaller than a ground voltage GND. On the contrary, when the auxiliary capacitor $C_B$ is additionally provided, the maximum size VHIGH of the clock may be lowered to the power supply voltage $V_{DD}$ or less, and the minimum size $V_{LOW}$ of the clock may be raised to the ground voltage GND or more.

Meanwhile, the power supply voltage $V_{DD}$ may be supplied from an arbitrary voltage source in the chip, and in order to control a difference between an output voltage of the voltage source and a power supply voltage to be supplied to the inverter, an arbitrary regulator may be provided between the voltage source and the inverter.

Referring to FIG. 7, in an example, the RC oscillator may receive the power through a low drop-output (LDO) circuit 210. Specifically, an output voltage Vin of the voltage source may be converted into a stable power supply voltage $V_{DD}$ through the LDO circuit 210, and the power supply voltage $V_{DD}$ may be supplied to each inverter in the RC oscillator.

Hereinafter, for convenience of description, it is assumed that the first and second RC oscillators 110 and 120 include a structure illustrated in FIG. 7.

A frequency f of the clock output from the RC oscillator may be determined according to the size of the resistor and the capacity of the capacitor, and specifically, may be determined according to [Equation 1].

$$f=\frac{1}{2}\pi RC \quad \text{[Equation 1]}$$

Here, the first and second RC oscillators 110 and 120 have the same interval capacitor capacity, but may have only different resistances. Specifically, the first RC oscillator 110 may have an in-chip first resistor as a component and the second RC oscillator 120 may have an in-chip second resistor as the component. In this case, the first and second resistors may be different resistors.

Specifically, resistance elements may be included in the chip at various positions. The first RC oscillator 110 may be connected to any one resistor among a plurality of resistance elements, i.e., the first resistor, and the second RC oscillator 120 may be connected to the other one resistor, i.e., the second resistor.

As described below, since the temperature of the chip is determined by a difference of the frequencies of the clocks output from the first and second RC oscillators 110 and 120, the first and second resistors may be appropriately selected in order to increase the frequency difference.

For example, when a poly resistor and a diffusion resistor are included in an integrated circuit, the diffusion resistor having a relatively large temperature coefficient of resistance may be used as the first resistor and the poly resistor having a relatively small temperature coefficient of resistance may be used as the second resistor.

Further, in order to maximize the frequency difference, the first resistor may be selected as a resistor having a maximum temperature coefficient of resistance in the chip and the second resistor may be selected as a resistor having a minimum temperature coefficient of resistance in the chip.

Specifically, the engineer may identify the resistor having the maximum temperature coefficient of resistance and the resistor having the minimum temperature coefficient of resistance when designing the SoC, and set both resistors as the components of the first and second RC oscillators 110 and 120, respectively. In this case, the difference between the frequencies of the clocks output from the first and second RC oscillators 110 and 120 may be the maximum.

The control unit 130 may determine the temperature of the chip according to what difference between the numbers of clocks output from the first and second RC oscillators 110 and 120, respectively is for the same time. Hereinafter, for convenience of description, the respective clocks output from the first and second RC oscillators 110 and 120 are distinguished into first and second clocks clk1 and clk2.

Referring to FIG. 8, since the first resistor constituting the first RC oscillator 110 has a large temperature coefficient of resistance, a frequency change amount of the first clock clk1 according to the temperature is large, while since the second resistor constituting the second RC oscillator 120 has a small temperature coefficient of resistance, a frequency change amount of the second clock clk2 according to the temperature may be small. As a result, the number of first clocks clk1 output for the same time may be larger than the number of second clocks clk2, and a difference in number of clocks may vary depending on the temperature of the chip.

A temperature-frequency relationship illustrated in FIG. 8 is predetermined according to the first and second resistors, and a temperature corresponding to the difference in number of clocks may be prestored in a memory (not illustrated), and the control unit 130 may determine the temperature according to the difference in number of clocks by referring to the memory.

In an exemplary embodiment, the control unit 130 may determine the temperature of the chip according to the number of second clocks clk2 output from the second RC oscillator for a time when the number of first clocks clk1 output from the first RC oscillator 110 reaches a predetermined clock number. In this case, since the control unit 130 samples the second clock clk2 based on the first clock clk1, a separate reference clock for signal sampling is not required in the present invention.

Referring to FIG. 9, for the above-described operation, the control unit 130 may include first and second bit counters 131 and 132 connected to output ends of the first and second RC oscillators 110 and 120, respectively, a counter driver 133 driving the first and second bit counters 131 and 132, and a processor 134. However, the control unit 130 illustrated in FIG. 9 follows an exemplary embodiment, and constituent elements constituting the control unit 130 are not limited to the exemplary embodiment illustrated in FIG. 9 and if necessary, some constituent elements may be added, modified, or deleted.

The processor 134 may apply start signals to the first and second RC oscillators 110 and 120, and according to the start signals, inverters in the first and second RC oscillators 110 and 120 may perform an inverting operation. As a result, the first and second RC oscillators 110 and 120 may output the first and second clocks clk1 and clk2, respectively.

The first bit counter 131 may count a rising edge of the first clock clk1, and the second bit counter 132 may count the rising edge of the second clock clk2. In this case, a capacity of the first bit counter 131 may be set to correspond to a predetermined clock number.

The counter driver 133 may stop operations of the first and second bit counters 131 and 132 when a most significant bit (MSB) of the first bit counter 131 in a high state (e.g., 1). For example, when the predetermined clock number is 8 and the capacity of the first bit counter 131 is 4 bits, if the rising edge of the first block clk1 is counted as 8, the MSB of the first bit counter 131 may become 1 as follows.

| Bit | $2^3$(MSB) | $2^2$ | $2^1$ | $2^0$ |
|---|---|---|---|---|
| Value | 1 | 0 | 0 | 0 |

When the MSB is switched from 0 to 1, the counter driver 133 may stop the operations of the first and second bit counters 131 and 132.

Referring back to FIG. 9, the control unit 130 may further include a first NAND gate 135 receiving the first clock clk1 as any one input and outputting a done signal as the other one input to output a logic result to the first bit counter 131, and a second NAND gate 136 receiving the second clock clk2 as any one input and the done signal as the other one input to output the logic result to the second bit counter 132.

In this case, the counter driver 133 may change the done signal to the high state when the MSB of the first bit counter 131 is in the high state. As a result, the high-state done signal may be input into each of the NAND gates 135 and 136, and a logic result of 0 may be input into each of the bit counters 131 and 132. That is, the input may not be input.

The processor 134 may identify a bit counted by the second bit counter 132 up to a stop time point of each of the bit counters 131 and 132, and determine the temperature of the chip based on the identified bit. Since the frequency of the first block clk1 is higher than the frequency of the second block clk2, the bit counted by the second bit counter 132 may be 5 as follows when the number of first clocks clk1 is counted as 8.

| Bit | $2^3$ | $2^2$ | $2^1$ | $2^0$ |
|---|---|---|---|---|
| Value | 0 | 1 | 0 | 1 |

The processor 134 may calculate a difference between two clocks as 3, and identify a temperature corresponding thereto by referring to the memory, and then determine the temperature of the chip as the identified temperature.

Meanwhile, when the bit number of the first bit counter 131 is fixed as such, the processor 134 may also determine the temperature of the chip based on only the bit counted by the second bit counter 132 without calculating the difference in number of clocks. In this case, the temperature corresponding to the bit counted by the second bit counter 132 may be prestored in the memory.

That is, in the above-described example, the processor may identify the temperature corresponding to the bit counted by the second bit counter 132, i.e., 5 by referring to the memory, and then determine the temperature of the chip as the identified temperature.

Last, referring to FIG. 10, when a signal flow in the control unit 130 is described, the first and second RC oscillators 110 and 120 may output the first and second clocks clk1 and clk2 in response to the start signal START provided by the processor 134. The first and second bit counters 131 and 132 may count the clock numbers of the first and second blocks clk1 and clk2, respectively, and when a MSB $2^n$ of the first bit counter 131 is in the high state in a counting process, the counter driver 133 may change the done signal DONE to the high state.

When the done signal is in the high state, the operations of the first and second bit counters 131 and 132 are stopped, and the processor 134 may identify the bit counted by the second bit counter 132 as data, and determine a temperature corresponding thereto as the temperature of the chip.

When the present invention is applied in order to sense temperatures at a plurality of positions in the chip as described in FIG. 2, a plurality of resistors arranged at various positions are included as constituent elements of a plurality of RC oscillators, respectively, and clocks output from the other RC oscillator are sampled based on a clock output from any one RC oscillator (preferably, an RC oscillator including a largest temperature coefficient of resistance), and a temperature at each position may be determined based thereon.

As such, according to the present invention, as resistance-based temperature sensing is possible without an external clock for temperature sampling, a substrate area for providing a temperature sensor can be minimized while maintaining a sensing performance having high accuracy and high resolution which are advantages resistance-based sensing.

Although the present invention has been described above by the drawings, but the present invention is not limited by the exemplary embodiments and drawings disclosed in the present invention, and various modifications can be made from the above description by those skilled in the art within the technical ideas of the present invention. Moreover, even though an action effect according to a configuration of the present invention is explicitly disclosed and described while describing the exemplary embodiments of the present invention described above, it is natural that an effect predictable by the corresponding configuration should also be conceded.

What is claimed is:

1. A resistance-based on-chip temperature sensor comprising:

a first RC oscillator having an in-chip first resistor as a component;

a second RC oscillator having an in-chip second resistor as the component; and a control unit determining the temperature of the chip according to what difference between the numbers of clocks output from the first and second RC oscillators, respectively is for the same time, wherein the first and second resistors are selected as resistors having maximum and minimum temperature coefficients of resistance, respectively.

2. The resistance-based on-chip temperature sensor of claim 1, wherein the first resistor is selected as an in-chip diffusion resistor and the second resistor is selected as an in-chip poly resistor.

3. The resistance-based on-chip temperature sensor of claim 1, further comprising:

a first auxiliary capacitor connected to one end of a first internal capacitor of the first RC oscillator; and a second auxiliary capacitor connected to one end of a second internal capacitor of the second RC oscillator.

4. A resistance-based on-chip temperature sensor comprising:

a first RC oscillator having an in-chip first resistor as a component;

a second RC oscillator having an in-chip second resistor as the component; and a control unit determining the temperature of the chip according to what difference between the numbers of clocks output from the first and second RC oscillators, respectively is for the same time, wherein the control unit determines the temperature of the chip according to the number of second clocks output from the second RC oscillator for a time when the number of first clocks output from the first RC oscillator reaches a predetermined clock number.

5. A resistance-based on-chip temperature sensor comprising:

a first RC oscillator having an in-chip first resistor as a component;

a second RC oscillator having an in-chip second resistor as the component; and a control unit determining the temperature of the chip according to what difference between the numbers of clocks output from the first and second RC oscillators, respectively is for the same time, wherein the control unit includes a first bit counter connected to an output end of the first RC oscillator and counting a rising edge of the first clock, a second bit counter connected to an output end of the second RC oscillator and counting the rising edge of the second clock, a counter driver stopping operations of the first and second bit counters when a most significant bit (MSB) of the first bit counter is in a high state, and a processor determining the temperature of the chip based on a bit counted by the second bit counter up to the time of the stop.

6. The resistance-based on-chip temperature sensor of claim 5, wherein the control unit further includes a first NAND gate receiving the first clock as any one input and a done signal as the other one input, and outputting a logic result to the first bit counter, and a second NAND gate receiving the second clock as any one input and a done signal as the other one input, and outputting the logic result to the second bit counter, and the counter driver changes the done signal to the high state when the MSB of the first bit counter is in the high state.

* * * * *